(12) United States Patent
Wang et al.

(10) Patent No.: US 12,510,887 B2
(45) Date of Patent: Dec. 30, 2025

(54) DATA PROCESSING METHODS AND APPARATUSES, ELECTRONIC DEVICE AND STORAGE MEDIUM

(71) Applicants: Beijing Zhongxiangying Technology Co., Ltd., Beijing (CN); BOE Technology Group Co., Ltd., Beijing (CN)

(72) Inventors: Yu Wang, Beijing (CN); Jiawei Ren, Beijing (CN); Wangqiang He, Beijing (CN); Haijin Wang, Beijing (CN); Dong Chai, Beijing (CN); Jianmin Wu, Beijing (CN); Hong Wang, Beijing (CN)

(73) Assignees: Beijing Zhongxiangying Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 829 days.

(21) Appl. No.: 17/764,863

(22) PCT Filed: Mar. 26, 2021

(86) PCT No.: PCT/CN2021/083429
§ 371 (c)(1),
(2) Date: Mar. 29, 2022

(87) PCT Pub. No.: WO2022/198680
PCT Pub. Date: Sep. 29, 2022

(65) Prior Publication Data
US 2025/0086652 A1    Mar. 13, 2025

(51) Int. Cl.
*G05B 23/02* (2006.01)
(52) U.S. Cl.
CPC .................................. *G05B 23/024* (2013.01)

(58) Field of Classification Search
CPC ............ G05B 23/024; G05B 19/41875; G06Q 30/018
See application file for complete search history.

(56) References Cited

U.S. PATENT DOCUMENTS 11,681,283 B1 * 6/2023 Shao ................ G05B 19/41875
702/187
2007/0239651 A1 * 10/2007 Koga ................... G05B 23/024
706/60
2012/0263376 A1   10/2012 Wang et al.

FOREIGN PATENT DOCUMENTS

CN         110276410 A       9/2019
CN         110647911 A       1/2020
(Continued)

OTHER PUBLICATIONS

Wenning Hao et al., Decision Tree Classification Experiment, Experiment Manual of Data and Analysis and Data Mining, ISBN 978-7-118-10797-5, Mar. 31, 2016, National Defense Industry Press, p. 128-129.
(Continued)

*Primary Examiner* — Jennifer Bahls
(74) *Attorney, Agent, or Firm* — IPro, PLLC

(57) ABSTRACT

The present disclosure provides data processing methods and apparatuses, an electronic device and a storage medium. The method includes: obtaining a product sample set; obtaining combination features in specified dimensions of the product sample set by processing a second parameter based on a preset dimension reduction algorithm; obtaining influence scores respectively for the combination features in specified dimensions based on a first parameter and the combination features in specified dimensions; obtaining at least one combination feature ranked top by sorting the combination features based on the influence scores, and taking a raw parameter corresponding to the at least one
(Continued)

combination feature as a cause of the product defect. In the embodiments of the present disclosure, combination features in R dimensions may be a combination of raw parameters having similarity such that similar parameters are associated while raw information of the product samples is retained, thus helping fast locating the cause of the product defect, and improving the detection efficiency.

12 Claims, 6 Drawing Sheets

(56) References Cited

FOREIGN PATENT DOCUMENTS

| | | |
|---|---|---|
| CN | 111427866 A | 7/2020 |
| CN | 109917777 B | 8/2020 |
| CN | 112269818 A | 1/2021 |
| WO | WO-2023154065 A1 * 8/2023 | ......... G05B 19/4184 |

OTHER PUBLICATIONS

Wenxing Wang, Analysis and Application of Stubborn Low-yield Problem of Product Manufacturing Based on Data Mining , Information Technology Section of China Excellent Master's Thesis Full-Text Database (Electronic journal), Jul. 15, 2020, Issue 7, ISSN: 1674-0246.

PCT/CN2021/083429 international search report.

* cited by examiner

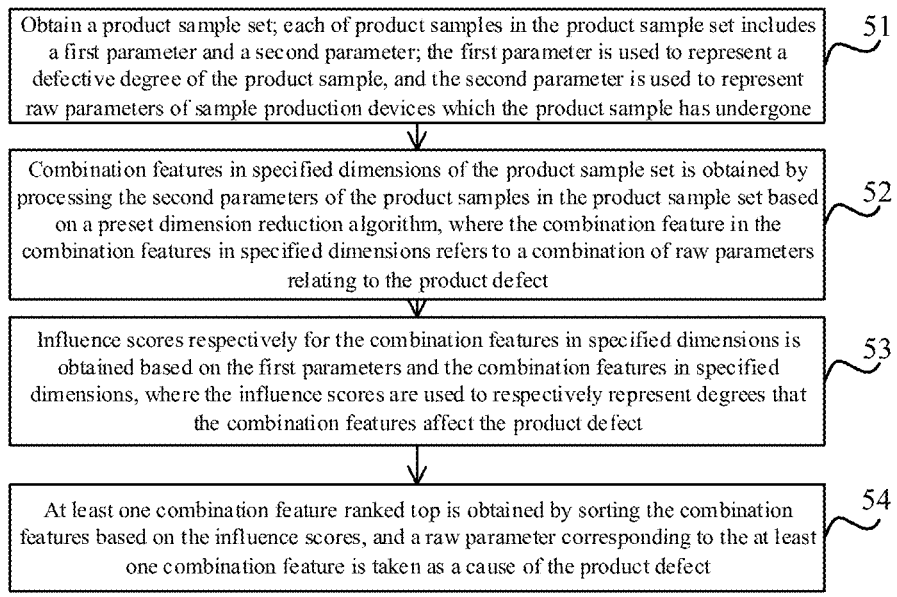
FIG. 4
FIG. 5
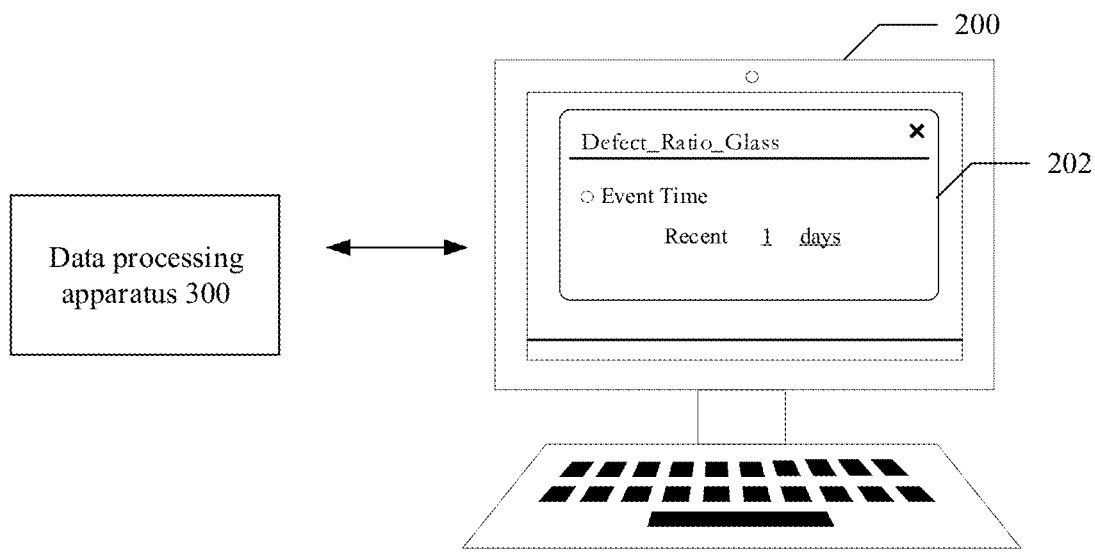
FIG. 6A

DATA PROCESSING METHODS AND APPARATUSES, ELECTRONIC DEVICE AND STORAGE MEDIUM

TECHNICAL FIELD

The present disclosure relates to the field of data processing technologies, and in particular to data processing methods and apparatuses, an electronic device and a storage medium.

BACKGROUND

At present, a production line of an industrial product includes multiple process devices, each of which may affect a yield rate of products when experiencing abnormal operation or abnormal working parameters. When a defective product appears in the production process, a working staff need to locate a cause of the defective product.

However, due to a large number of process devices in a production line or a huge amount of generated data, which increases the complexity of locating the cause, and thus consumes a large amount of time to locate the faulty device.

SUMMARY

The present disclosure provides data processing methods and apparatuses, an electronic device, and a storage medium to solve the shortcomings of the related arts.

According to a first aspect of embodiments of the present disclosure, there is provided a data processing method. The method includes:

obtaining a product sample set, where each of product samples in the product sample set includes a first parameter and a second parameter; the first parameter is used to represent a defective degree of the product sample, and the second parameter is used to represent raw parameters of sample production devices which the product sample has undergone;

obtaining combination features in specified dimensions of the product sample set by processing the second parameters of the product samples in the product sample set based on a preset dimension reduction algorithm, where each of the combination features in specified dimensions refers to a combination of the raw parameters relating to a product defect;

obtaining influence scores respectively for the combination features in specified dimensions based on the first parameters and the combination features in specified dimensions, where the influence scores are used to respectively represent degrees that the combination features affect the product defect;

obtaining at least one combination feature ranked top by sorting the combination features based on the influence scores, and taking a raw parameter corresponding to the at least one combination feature as a cause of the product defect.

Optionally, the dimension reduction algorithm includes at least one of: principal component analysis (PCA), linear discriminant analysis (LDA), locally linear embedding (LLE), and Laplacian Eigenmaps (LEP).

Optionally, the dimension reduction algorithm includes principal component analysis (PCA), and obtaining the combination features in specified dimensions of the product sample set by processing the second parameter based on the preset dimension reduction algorithm includes:

obtaining combination features in K dimensions of the product sample set by processing the second parameters based on PCA; taking the combination features in K dimensions as the combination features in specified dimensions.

Optionally, the dimension reduction algorithm comprises principal component analysis (PCA), and obtaining the combination features in specified dimensions of the product sample set by processing the second parameter based on the preset dimension reduction algorithm includes:

obtaining a first combination feature for each product sample by merging the raw parameters based on a keyword in the second parameter;

obtaining the combination features in K dimensions of the product sample set by processing the second parameters based on PCA;

obtaining combination features in R dimensions of the product sample set by obtaining an intersection of the first combination features and the combination features in K dimensions, and taking the combination features in R dimensions as the combination features in specified dimensions.

Optionally, obtaining the combination features in K dimensions of the product sample set by processing the second parameters based on PCA includes:

obtaining an average value for each of the raw parameters of the product sample set and obtaining a new value of each of the raw parameters in the product sample set by subtracting the corresponding average value from each of the raw parameters in the product sample set;

obtaining a covariance matrix by obtaining a covariance of every two of the raw parameters in the second parameter, wherein each covariance value in the covariance matrix represents a similarity of two raw parameters;

obtaining feature values and feature vectors of the covariance matrix, and obtaining a cumulative contribution value corresponding to each of the feature values, wherein the feature vector includes a weight corresponding to each of the raw parameters;

obtaining K principal component features by obtaining the feature values and the feature vectors with the cumulative contribution values exceeding a preset contribution value threshold;

obtaining the combination features in K dimensions of the product sample set by obtaining a component of the new value of each of the raw parameters on the feature vector.

Optionally, obtaining influence scores respectively for the combination features in specified dimensions based on the first parameters and the combination features in specified dimensions includes:

obtaining the combination feature vector in each of the specified dimensions based on the combination features in specified dimensions, wherein the combination feature vector in each of the specified dimensions includes the combination features in same dimension for the respective product samples;

obtaining purity indexes with the same number as the product samples in the product sample set by calculating the purity indexes respectively corresponding to the combination features in each of the specified dimensions, wherein the purity index is used to represent a degree that each of the combination features affects the product defect;

obtaining a minimum value of the purity indexes corresponding to the combination features in each of the specified dimensions, wherein the minimum value is used to represent a confidence threshold of the first parameter;

obtaining the influence score for the corresponding combination feature based on the minimum value.

Optionally, the purity index includes at least one of information gain, information gain ratio and Gini coefficient.

Optionally, the Gini coefficient is calculated in the following formula:

$$Gini(X) = 1 - \sum_{K=1}^{2}\left(\frac{|C_K|}{|X|}\right)^2;$$

wherein |X| represents, when any one combination feature vector in the product sample set X is taken as a cut point, a number of product samples in a data combination located at a specified side of the cut point; K represents a type of the product defect, which is set as 2 types herein; $|C_K|$ represents a number of product samples of the K-th class in the data combination located at the specified side of the cut point.

Optionally, the method further includes:

for each of the at least one combination feature, displaying at least two raw parameters with weights ranked top in the combination features.

According to a second aspect of embodiments of the present disclosure, there is provided a data processing method. The method includes:

in response to a first input by a user on a first interface, obtaining a first parameter of each product sample in a product sample set, wherein the first parameter is used to represent a defective degree of the product sample;

in response to a second input by a user on a second interface, obtaining a second parameter of each of product samples in the product sample set, wherein the second parameter is used to represent raw parameters of sample production devices which the product sample has undergone;

in response to a third input by a user on a third interface, displaying at least one combination feature on the third interface, wherein a raw parameter corresponding to at least one combination feature is taken as a cause of a product defect, and the at least one combination feature is obtained according to the first parameter and the second parameter.

Optionally, the at least one combination feature displayed on the third interface is sorted in a descending or ascending order based on corresponding influence scores, where the influence scores are used to respectively represent degrees that the combination features affect the product defect.

Optionally, displaying at least one combination feature on the third interface includes:

for each of the at least one combination feature, displaying at least two raw parameters with weights ranked top in the combination features.

Optionally, obtaining at least one combination feature according to the first parameter and the second parameter specifically includes:

obtaining combination features in specified dimensions of the product sample set by processing the second parameters of the product samples in the product sample set based on a preset dimension reduction algorithm, where each of the combination features in specified dimensions refers to a combination of raw parameters relating to the product defect;

obtaining influence scores respectively for the combination features in specified dimensions based on the first parameters and the combination features in specified dimensions, where the influence scores are used to respectively represent degrees that the combination features affect the product defect;

obtaining at least one combination feature ranked top by sorting the combination features based on the influence scores, and taking a raw parameter corresponding to the at least one combination feature as a cause of the product defect.

Optionally, after obtaining the first parameter of each of product samples in the product sample set, the method further includes:

displaying a distribution diagram of the first parameter of each product sample.

Optionally, after obtaining the second parameter of each of product samples in the product sample set, the method further includes:

displaying a corresponding relationship of each second parameter.

Optionally, the product sample includes a display panel motherboard; the display panel motherboard includes a plurality of display panels.

According to a third aspect of embodiments of the present disclosure, there is provided a data processing apparatus. The apparatus includes:

a sample set obtaining module, configured to obtain a product sample set, where each of product samples in the product sample set includes a first parameter and a second parameter, the first parameter is used to represent a defective degree of the product sample, and the second parameter is used to represent raw parameters of sample production devices which the product sample has undergone;

a combination feature obtaining module, configured to obtain combination features in specified dimensions of the product sample set by processing the second parameters of the product samples in the product sample set based on a preset dimension reduction algorithm, where each of the combination features in specified dimensions refers to a combination of the raw parameters relating to a product defect;

an influence score obtaining module, configured to obtain influence scores respectively for the combination features in specified dimensions based on the first parameters and the combination features in specified dimensions, where the influence scores are used to respectively represent degrees that the combination features affect the product defect;

a defect cause obtaining module, configured to obtain at least one combination feature ranked top by sorting the combination features based on the influence scores, and take a raw parameter corresponding to the at least one combination feature as a cause of the product defect.

According to a fourth aspect of embodiments of the present disclosure, there is provided a data processing apparatus. The apparatus includes:

a first parameter obtaining module, configured to, in response to a first input by a user on a first interface, obtain a first parameter of each product sample in a product sample set, where the first parameter is used to represent a defective degree of the product sample;

a second parameter obtaining module, configured to, in response to a second input by a user on a second interface, obtain a second parameter of each of product samples in the product sample set, where the second parameter is used to represent raw parameters of sample production devices which the product sample has undergone;

a defect cause obtaining module, configured to, in response to a third input by a user on a third interface, display at least one combination feature on the third interface, where a raw parameter corresponding to the at least one combination feature is taken as a cause of a product defect, and the at least one combination feature is obtained based on the first parameter and the second parameter.

According to a fifth aspect of embodiments of the present disclosure, there is provided an electronic device, including:

a processor;

a memory, configured to store computer programs executable by the processor;

where the processor is configured to execute the computer programs in the memory to implement the above method.

According to a sixth aspect of embodiments of the present disclosure, there is provided a computer readable storage medium, where executable computer programs in the storage medium are executed by a processor to implement the above method.

The technical solution provided by the embodiments of the present disclosure may include the following technical beneficial effects.

As known from the above embodiments, in the technical solution provided by the embodiments of the present disclosure, the combination features in specified dimensions of each product sample may be obtained to reduce a dimension of data of the product sample where the dimension of the combination features in specified dimensions is smaller than that of parameter in each product sample; further, the combination features in specified dimensions may be a combination of raw parameters having similarity, such that similar parameters are associated while raw information of the product sample is retained, thereby facilitating fast locating a cause of the product defect and improving the detection efficiency.

It should be understood that the above general descriptions and subsequent detailed descriptions are merely illustrative and explanatory rather than limiting of the present disclosure.

BRIEF DESCRIPTION OF THE DRAWINGS

The accompanying drawings, which are incorporated in and constitute a part of the present description, illustrate embodiments consistent with the present disclosure and serve to explain the principles of the present disclosure together with the description.

FIG. 4 is a block diagram illustrating another electronic device according to an embodiment of the present disclosure.

FIG. 5 is a flowchart illustrating a data processing method according to an embodiment of the present disclosure.

FIG. 6A is a schematic diagram illustrating a first interface according to an embodiment of the present disclosure.

DETAILED DESCRIPTION OF THE EMBODIMENTS

Figure 1:
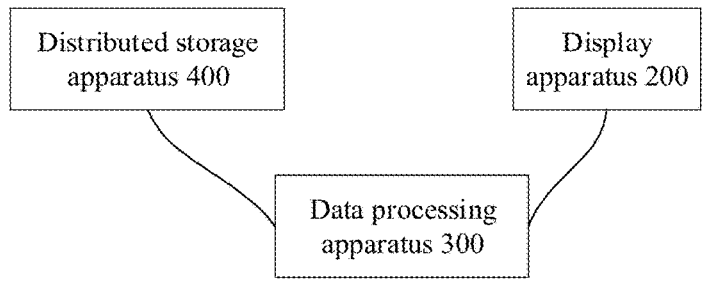
FIG. 1 is a block diagram illustrating a data processing system according to an embodiment of the present disclosure.

Exemplary embodiments will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

At present, a production line of an industrial product includes multiple process devices, each of which may affect a yield rate of products when experiencing abnormal operation or abnormal working parameters. When a defective product appears in the production process, a working staff need to locate a cause of the defective product. However, due to a large number of process devices in a production line or a huge amount of generated data, which increases the complexity of locating the cause, and thus consumes a large amount of time to locate the faulty device.

One or more embodiments of the present disclosure provide a data processing system. As shown in FIG. 1, the data processing system 100 includes a data processing apparatus 300, a display apparatus 200 and a distributed storage apparatus 400. The data processing apparatus 300 is connected to the display apparatus 200 and the distributed storage apparatus 400 respectively.

The distributed storage apparatus 400 is configured to store production data generated by multiple sample production devices (or referred to as factory devices). For example, the production data generated by the multiple sample production devices includes production records of the multiple sample production devices. For example, the production records include information of sample production devices which multiple samples have undergone during production processes and information of defect types. Each sample goes through multiple sample production devices during production processes, and each sample production device participates and only participates in the production processes of some of the multiple samples.

The distributed storage apparatus stores relatively complete data (for example, one database). The distributed storage apparatus may include multiple memories of hardware, and the various memories of hardware are distributed in various physical locations (for example, in various factories or in various production lines) and can perform information transmission mutually through wireless transmission (for example, through network and the like). In this way, the data is in a distributed scheme, but logically, form a database based on big data technology.

Figure 2:
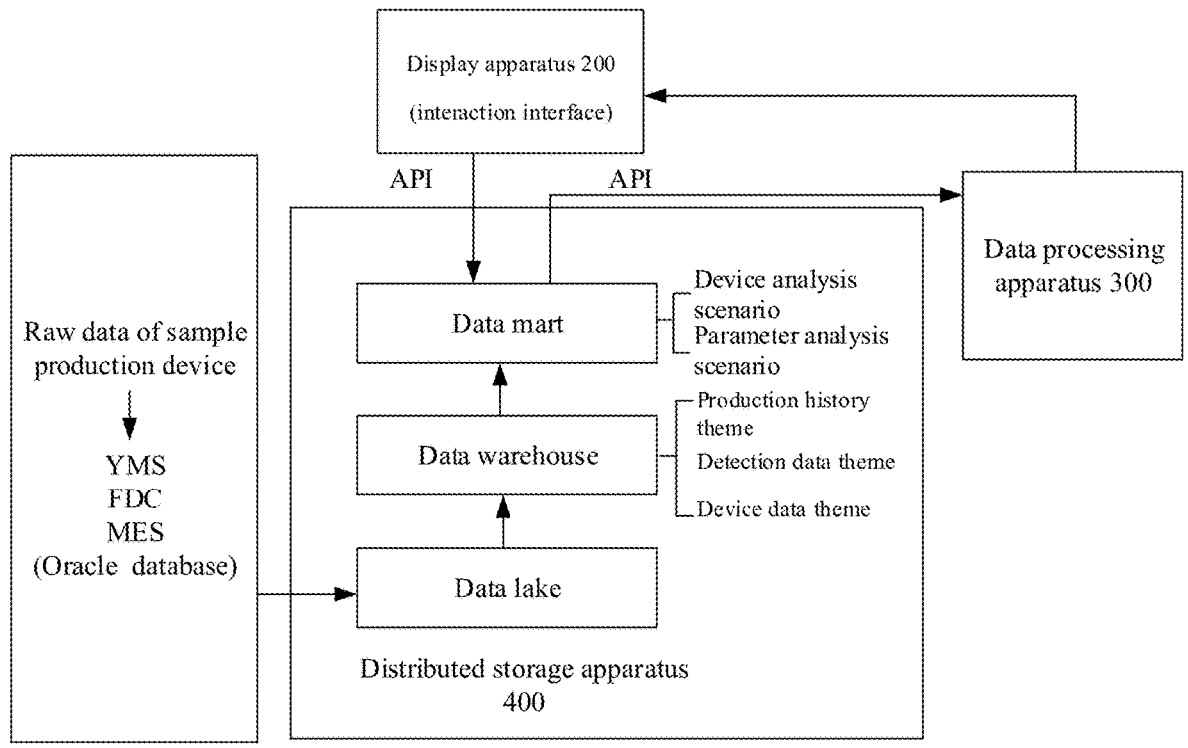
FIG. 2 is a block diagram illustrating another data processing system according to an embodiment of the present disclosure.

With reference to FIG. 2, a large amount of raw data of different sample production devices is stored in corresponding production manufacturing systems, for example, relational databases (for example, Oracle and Mysql and the like) such as Yield Management System (YMS), Fault Detection & Classification (FDC), Manufacturing Execution System (MES), and the like. Raw table extraction may be performed for these raw data through a data extraction tool (for example, Sqoop and kettle and the like) to transmit it to the distributed storage apparatus (for example, Hadoop Distributed File System, HDFS), so as to reduce the loads of the sample production devices and the production manufacturing system, thus helping subsequent data reading of analysis devices.

The data in the distributed storage apparatus may be stored in the format of Hive tool or Hbase database. For example, according to the Hive tool, the above raw data is firstly stored in a data lake; and then pre-processing such as data cleaning and data transformation are performed based on application subject and scenario and the like of data in the Hive tool to obtain data warehouses having different subjects (for example, production history subject, detection data subject, device data subject) and data marts having different scenarios (for example, device analysis scenario and parameter analysis scenario). The above data mart may be then connected to the display device and analysis device through different API interfaces to achieve data interaction with these devices.

Due to multiple sample production devices of multiple factories involved, the volume of the above raw data will be very huge. For example, raw data generated by all sample production devices each day may reach multiple hundred GBs and the data generated each hour may reach dozens of GBs.

In an embodiment, there are two major solutions for achieving storage and computation for massive structured data: a grid computing solution of Relational Database Management System (RDBMS); and a big data solution of Distributed File System (DFS).

The grid computing of RDBMS divides a problem requiring a huge computing power into many small parts and then distributes these parts to many computers for separate processing, and finally summarizes these computing results. For example, Oracle RAC is a core technology of grid computing supported by the Oracle database, where all servers may directly access all data in the database. However, the application system of grid computing of RDBMS cannot satisfy user requirements in a case of a large data volume. For example, since the extension space of hardware is limited, after the data increases to a sufficiently big order of magnitude, the data processing efficiency will be very low due to the bottleneck of input/output of the hard disk.

The DFS-based big data technology allows construction of a large cluster by use of many inexpensive hardware devices so as to process the massive data. For example, the Hive tool is a data warehouse tool based on Hadoop which can be used to perform data extraction, transformation and loading (ETL). The Hive tool defines a simple SQL-like query language and at the same time, also allows a complex analysis by mapper and reducer of a self-defined MapReduce, which cannot otherwise be completed by the tool. The Hive tool does not have a special data storage format nor establish an index for data. Thus, a user may organize tables therein freely to process data in the database. As a result, the parallel processing of the distributed file management can satisfy the requirements of storage and processing of massive data. The user may query and process simple data through SQL and complex processing may be carried out by self-defined function. Therefore, during analysis of massive data of factories, it is required to extract the data of the factory database to the distributed file system, which not only avoids damage to the raw data but also improves data analysis efficiency.

In an embodiment, the distributed storage apparatus 400 may be one memory or a plurality of memories or collectively refers to a plurality of storage elements. For example, the memory may include Random Access Memory (RAM), Double Data Rate Synchronous Dynamic Random Access Memory (DDR SRAM) or include non-volatile memory, for example, magnetic disk memory and flash memory and the like.

The data processing apparatus 300 is configured to implement a data processing method according to any one of the following embodiments. For example, the data processing apparatus 300 may obtain production records of multiple sample production devices, determine an influence score corresponding to each sample production device based on the production records of multiple sample production devices, and obtain a raw parameter relating to the product defect based on the influence score.

The display apparatus 200 is configured to display an interface. For example, the interface may include a first interface, a second interface and a third interface described below. For example, the display apparatus 200 may display a processing result of the data processing apparatus 300.

In an embodiment, the display apparatus may be a display or a product including a display, for example, television, computer (all-in-one machine or desktop computer), computing machine, tablet computer, smart phone, and electronic painting screen and the like. In an embodiment, the display apparatus may be any apparatus displaying moving (for example, video) or stationary (for example, stationary image) words or images. More specifically, it is anticipated that the embodiment may be implemented in multiple types of electronic apparatuses or associated with multiple types of electronic apparatuses. The multiple types of electronic apparatuses may be, for example (but not limited to), game console, television monitor, tablet display, computer monitor, vehicle display (for example, odometer display and the like), navigator, cockpit controller and/or display, electronic photo, electronic advertising board or indicating board, projector, building structure, packaging and aesthetic structure (for example, a display of an image of one jewel) and the like.

In an embodiment, the display apparatus described herein may include one or more displays or one or more terminals having display function. In this case, the data processing apparatus may send the data processed by itself (for example, influence parameter) to the display apparatus and the display apparatus then displays the data. Namely, through the interface of the display apparatus (i.e. user interaction interface), full interaction between the user and the system for analyzing sample defect cause can be achieved (control and receive a result).

Figure 3:
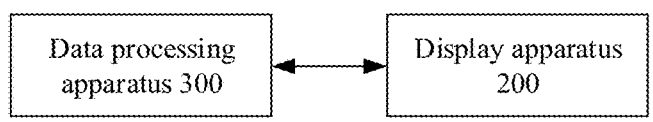
FIG. 3 is a block diagram illustrating an electronic device according to an embodiment of the present disclosure.

One or more embodiments of the present disclosure provide an electronic device. For example, the electronic device may be a computer and a computing machine and the like. As shown in FIG. 3, the electronic device 500 includes a data processing apparatus 300 and a display apparatus 200. The display apparatus 200 is connected with the data processing apparatus 300.

The data processing apparatus 300 is configured to implement a data processing method according to any one of the following embodiments. The display apparatus 200 is configured to display an interface. For example, the display apparatus 200 is configured to display a processing result of the data processing apparatus 300.

It should be noted that the data processing apparatus and the display apparatus in the above electronic device are similar to those in the above data processing system. Therefore, reference may be made to the above descriptions for specific contents of the data processing apparatus and the display apparatus in the electronic device and no redundant descriptions are made herein.

In some embodiments, as shown in FIG. 4, the data processing apparatus 300 includes a memory 301 and a processor 302, where the memory 301 is connected with the processor 302. In an embodiment, the processor and the memory are connected via, for example, an I/O interface, so as to achieve information interaction.

The memory 301 stores one or more computer programs which can be run on the processor 302.

The processor 302 executes the computer program to enable the data processing apparatus 300 to implement the data processing method according to any one of the following embodiments.

In an embodiment, the above processor 302 may be one processor, or a collective name of a plurality of processing elements. For example, the processor 302 may be a central processing unit (CPU), a microprocessor, an application specific integrated circuit (ASIC), or one or more integrated circuits for control program execution of the solution of the present disclosure, for example, one or more microprocessors. For another example, The processor 302 may be a programmable device such as Complex Programmable Logic Device (CPLD), Erasable Programmable Logic Device (EPLD), or field-programmable gate array (FPGA).

The above memory 301 may be one memory or a collective name of a plurality of storage elements and configured to store executable program codes and the like. Further, the memory 301 may include a random access memory, or a non-volatile memory such as magnetic disk memory and flash memory and the like.

The memory 301 is configured to store application program codes for executing the solution of the present disclosure and the application program codes are controlled and executed by the processor 302. The processor 302 is configured to execute the application program codes stored in the memory 301 to control the data processing apparatus 300 so as to implement the data processing method according to any one of the following embodiments.

One or more embodiments of the present disclosure further provide a data processing method. For example, the data processing method may be applied to the above electronic device, data processing system and data processing apparatus. As shown in FIG. 5, the data processing method includes steps 51-54.

At step 51, a product sample set is obtained; each of product samples in the product sample set includes a first parameter and a second parameter; the first parameter is used to represent a defective degree of the product sample, and the second parameter is used to represent raw parameters of sample production devices which the product sample has undergone.

In this embodiment, the electronic device may obtain the product sample set. The product sample set includes multiple product samples. In an embodiment, this embodiment may be used in a display panel production line, for example, in a production process of a display panel (e.g. liquid crystal display panel, organic light emitting diode display panel and the like), to determine a relevance of each production device of the display panel production line and a defect type. The embodiment of the present disclosure may also be applied to other products. In an embodiment, the product sample includes a display panel motherboard (glass) and the display panel motherboard includes multiple display panels. For example, the display panel motherboard may further include a substrate and multiple display panels are disposed on the substrate. In an embodiment, the substrate may include a rigid substrate made of glass or the like (or called a hard substrate), or a flexible substrate made of Polyimide (PI) or the like. The substrate may further include a thin film such as a buffer layer disposed on the rigid substrate or the flexible substrate.

It should be noted that the "defect" in the embodiments of the present disclosure refers to a quality defect in the product samples, where these defects may cause the product samples to have a lower quality or retire, or may cause the product samples to be reworked or repaired. That is, the product sample defects in the present disclosure may be divided into different types based on requirements. For example, the product samples may be classified based on direct influence of the defects on the sample performance, for example, based on bright line defect, dark line defect, firefly defect (hot spot) and the like. Alternatively, the product samples may also be classified based on substantial defect causes such as array process defect and color filter process defect. Alternatively, the product samples may be classified based on defect severity such as defect resulting in retirement and defect resulting in lower quality. Alternatively, the defects can also have no types, that is, the product samples may be classified as defective products as long as they have any defect regardless of what type is the defect, otherwise, if they have no defect, they are classified as defect-less products.

The defect type of the product sample set is one defect type, namely, multiple product samples included in the product sample set have the same defect type. That is, the data processing method provided by the embodiments of the present disclosure is implemented for one defect type; or, the cause of the product defect type (i.e. parameter) may be obtained each time.

Figure 6B:
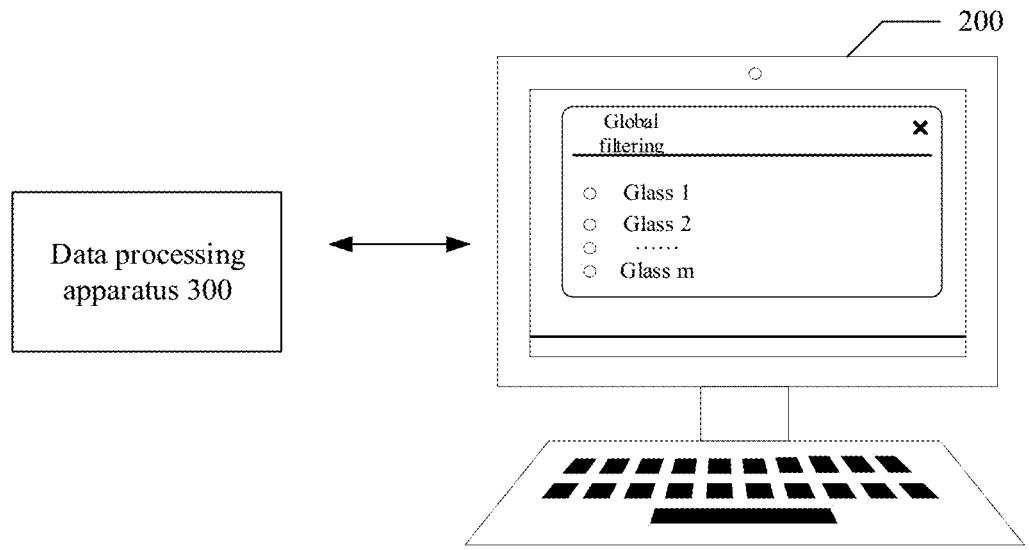
FIG. 6B is a schematic diagram of obtaining a product sample according to an embodiment of the present disclosure.
Figure 6C:
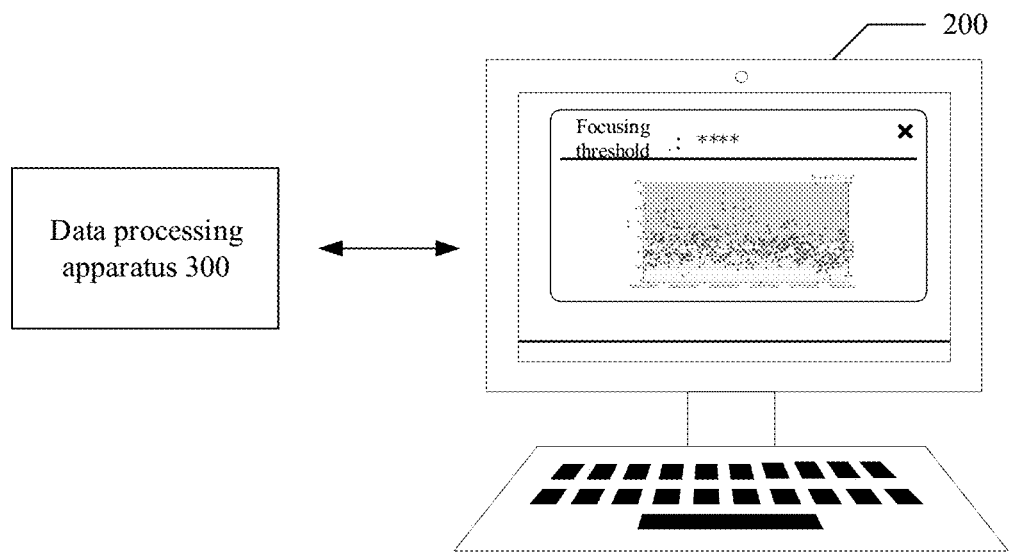
FIG. 6C is a schematic diagram of obtaining a first parameter distribution according to an embodiment of the present disclosure.

In an embodiment, as shown in FIG. 6A, the display apparatus 200 may display a first interface 201, and a user performs a first input on the first interface 201, for example, in a time range from a time T1 to a time T2 (for example, one day). In response to the input, the data processing apparatus 300 obtains the product sample set within the above time range and obtains a selection result as shown in FIG. 6B. The user may also input a focusing threshold (defect_ratio_glass) in the first interface 201 at the same time to divide the selected product samples so as to obtain a first parameter as shown in FIG. 6C. As shown in FIG. 6C, after the focusing threshold is set, the electronic device may display a distribution diagram of the first parameter of each product sample.

When the user selects different focusing thresholds, the data table shown in Table 1 may be obtained.

TABLE 1

Data table with defect selected as Defect_code1

| GlassID | Check Step | Defect_Name | Ratio | END_TIME |
|---|---|---|---|---|
| GlassID 1 | Check Step1 | Defect_code1 | 0.022 | Jan. 24, 2021 08:25:03 |
| GlassID 2 | Check Step1 | Defect_code1 | 0.264 | Jan. 28, 2021 07:43:11 |
| ... | ... | ... | ... | ... |
| GlassID m | Check Step1 | Defect_code1 | 0.011 | Feb. 11, 2021 20:37:45 |

Figure 7A:
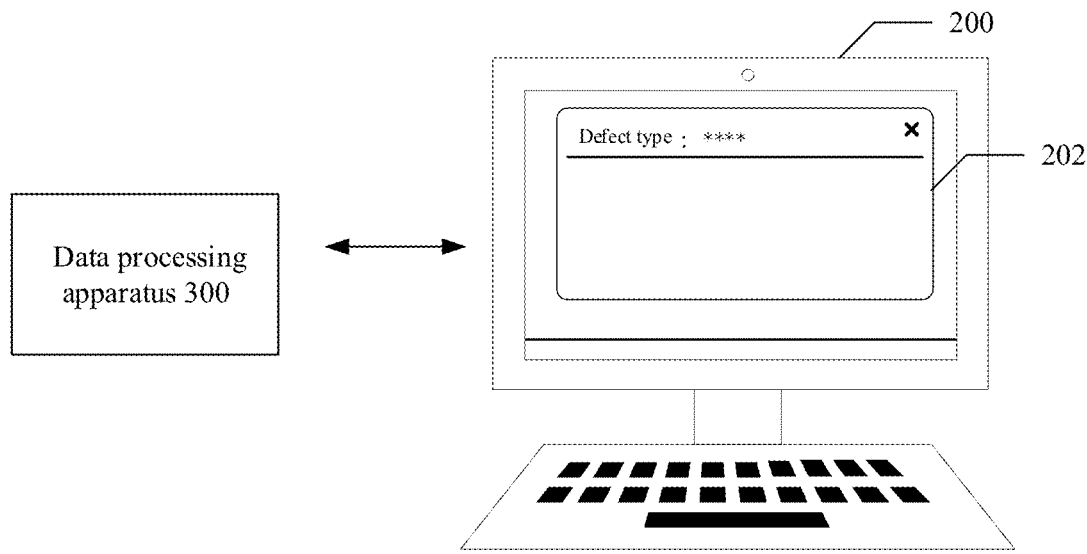
FIG. 7A is a schematic diagram of setting a defect type according to an embodiment of the present disclosure.
Figure 7B:
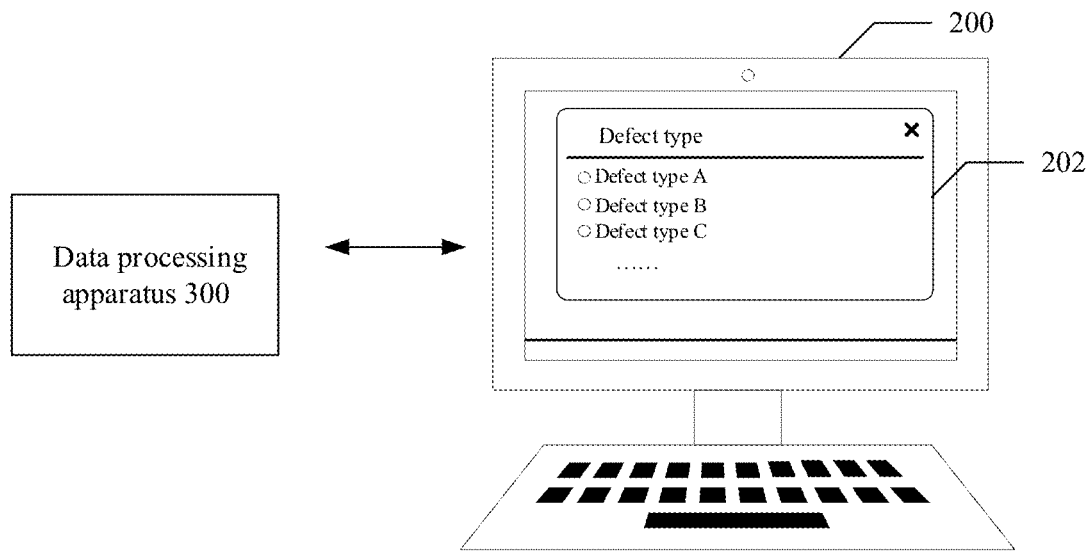
FIG. 7B is a schematic diagram of selecting a defect type according to an embodiment of the present disclosure.

In an embodiment, as shown in FIG. 7A and FIG. 7B, the display apparatus 200 displays an interface 202, and the user performs input on the interface 202. The data processing apparatus determines a defect type for the sample set in response to the input. For example, the above input is to input one defect type, which is a defect type to be analyzed. For example, as shown in FIG. 7A, the interface 202 may display a first input box and the first input of the user on the interface 202 may be to directly input a defect type in the first input box on the interface 202 to determine a defect type of the product sample set. For example, the electronic device or the data processing system may pre-configure a database including multiple defect types. With reference to FIG. 7B, the interface 202 may display a first selection box which includes options of multiple defect types (for example, a defect type A, a defect type B and a defect type C and the like in FIG. 7B). The first input of the user on the interface 202 may be to make selection from the options of multiple defect types to determine a defect type for the product sample set. It should be noted that selection may be performed as actually required in the step, which is not limited herein.

Each product sample includes a first parameter and a second parameter. The first parameter is used to represent a defective degree of a product sample belonging to a defect type obtained by the above interface 202; and the second parameter is used to represent raw parameters of sample production devices which the product sample has undergone.

In an embodiment, the first parameter of the product sample may represent that the sample belongs to a good sample or a defect sample of the defect type. For example, according to the first parameter of the product sample, it is determined that the product sample is a good sample (positive sample) or a defect sample (negative sample) of the defect type. For example, for a defect type of the sample set, the positive samples and the negative samples of multiple product samples may be obtained according to the first parameters of the multiple product samples in the product sample set.

In an embodiment, the first parameter of the product sample is used to represent the defective degree of the product sample. For example, in a case that the product sample is a display panel motherboard, in multiple display panels of the display panel motherboard, a ratio of a total number of defective display panels of a defect type to a total number of the multiple display panels of the display panel motherboard is taken as a value representing a defective degree in the first parameter of the product sample, and the ratio may also be referred to a defect rate of the samples; alternatively, a total number of defective display panels of a defect type in multiple display panels of the display panel motherboard is taken as value representing a defective degree in the first parameter of the product sample. In this case, the larger the value representing a defective degree in the first parameter of the product sample is, the larger the represented defective degree of the defect type is.

In another embodiment, in a case that the product sample is a display panel motherboard, in multiple display panels of the display panel motherboard, a ratio of a total number of display panels other than defective display panels of a defect type to a total number of the multiple display panels is taken as a value representing a defective degree in the first parameter of the sample; alternatively, in multiple display panels of the display panel motherboard, a total number of display panels other than defective display panels of a defect type is taken as a value representing a defective degree in the first parameter of the sample. Alternatively, it is a ratio of a total number of pixel good points to a total number of pixels in the display panel. In this case, the smaller the value representing a defective degree in the first parameter of the sample is, the larger the represented defective degree of the defect type is.

It may be understood that many products (e.g. display panels) are manufactured through production lines, each production line includes multiple process stations and each of the process stations is used to perform a given processing (e.g. cleaning, depositing, exposure, etching, substrate pairing and detection and the like) for the products (including semi-finished products). Further, each process station usually has multiple sample production devices for performing the same processing (i.e. process devices). Although such processing is theoretically same, the actual processing effects are not exactly same due to different models, states and the like of the different process devices. In this case, each sample needs to go through multiple process stations in a production process, different samples may need to go through different process stations in a production process, and the samples going through the same process station may be processed by different sample production devices therein. As a result, in one production line, each sample production device may participate in a production process of some samples rather than all samples, that is, each sample production device will participate and only participate in the production process of some samples.

In an embodiment, the second parameter is used to represent a raw parameter of the sample production device which the product sample has undergone and may include: name, model or code of the sample production device which the product sample has undergone, names of process station, production line or factory where the sample production device is located and a time when the sample production device completes the production of the sample and the like. Each product sample may correspond to multiple sample production devices, and there will be multiple raw parameters, represented by the second parameter, of multiple sample production devices which the product sample has undergone. A skilled person may select a proper second parameter according to specific scenario and the corresponding solution falls into the scope of protection of the present disclosure in case of capable of obtaining combination features in R dimensions or subsequent influence score using the second parameter.

At step 52, combination features in specified dimensions of the product sample set are obtained by processing the second parameters of the product samples in the product sample set based on a preset dimension reduction algorithm, where the combination features of the combination features in specified dimensions refer to a combination of raw parameters relating to the product defect.

Figure 8:
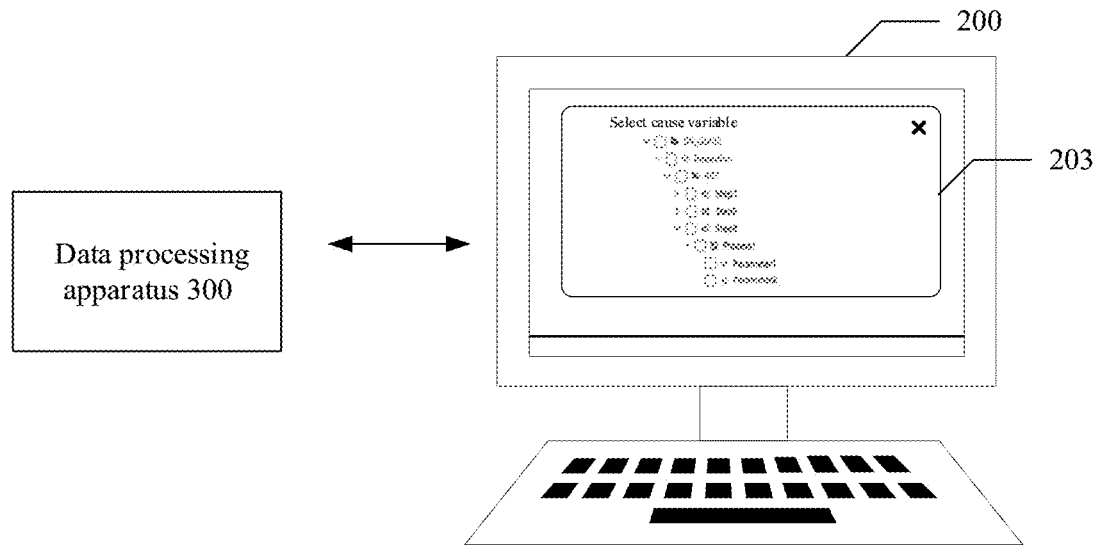
FIG. 8 is a schematic diagram of setting a corresponding relationship according to an embodiment of the present disclosure.

It should be noted that because the cause of the product defect may be a sample production device or a process parameter, the raw parameter may include a device or a parameter. In step 51, after the sample production device is selected, the electronic device may also display the second interface shown in FIG. 8 at the same time: a user may perform a second input on the second interface and the electronic device may establish a corresponding relationship between the sample production device and the process parameter in response to the second input, for example, for a corresponding relationship "DataTag-Step-Process-Parameter", where "DataTag" represents a product sample (e.g. GlassID), "Step" represents a corresponding sample production device, "Process" represents one processing step in the sample production device, and "Parameter" represents one raw parameter of the processing step, (e.g. temperature, pressure, flow rate and the like). That is, the electronic device may thus obtain the second parameter of the product sample, and FIG. 8 shows a corresponding relationship of one second parameter thereof.

Figure 9:
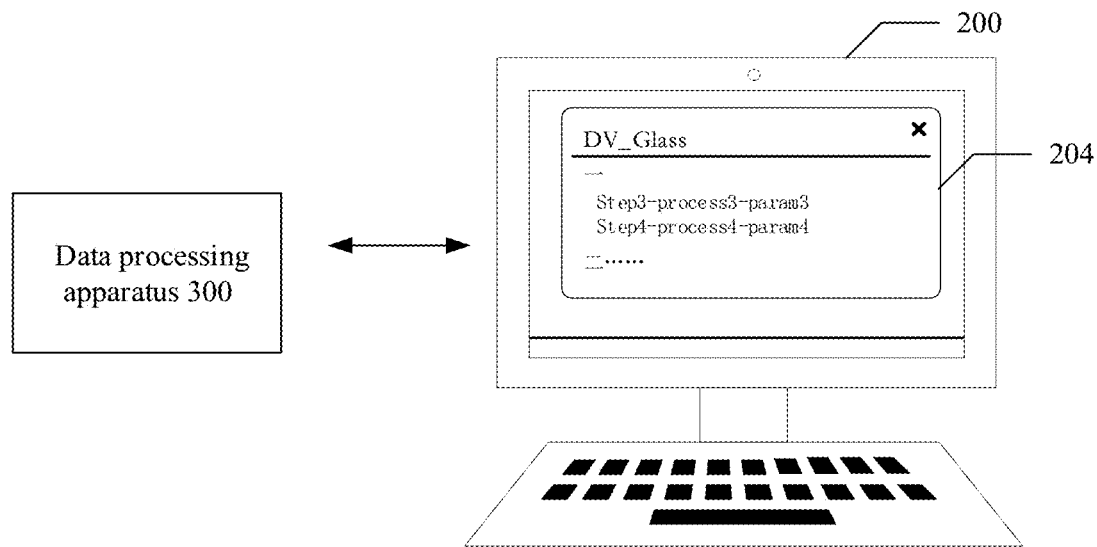
FIG. 9 is a schematic diagram illustrating a third interface displaying at least one combination feature according to an embodiment of the present disclosure.

In an actual application, after establishing the corresponding relationship, the user may click on an analysis button, and then, the electronic device may analyze the cause of the product defect based on the combination features in R dimensions and the first parameters and finally display a third interface as shown in FIG. 9.

In this embodiment, the electronic device may obtain combination features in specified dimensions of the product sample set based on the second parameters, or in other words, the electronic device may obtain combination features in specified dimensions of each of product samples in the product sample set.

In an example, the electronic device may obtain the combination features in specified dimensions based a preset dimension reduction algorithm. The above dimension reduction algorithm includes at least one of: principal component analysis (PCA), linear discriminant analysis (LDA), locally linear embedding (LLE), and Laplacian Eigenmaps (LEP). A skilled person may select a proper dimension reduction algorithm based on a specific scenario and the corresponding solution will fall into the scope of protection of the present disclosure.

Illustratively, the electronic device may select K principal component features from the second parameter and obtain a second combination feature for each product sample based on the K principal component features, where a cumulative contribution value of the K raw parameters to the second parameter exceeds a preset contribution value threshold. For example, the electronic device may obtain an average value of raw parameters of the product sample set and obtain a new value of each of the raw parameters for each product sample by subtracting the average value from each of the raw parameters corresponding to each product sample. Decentralization of the raw parameter of each product sample may reduce the size of the raw parameter and obtain a change range of the raw parameter, thereby facilitating subsequent computing. Illustratively, in this embodiment, the combination features in specified dimensions may be obtained by the Principal Component Analysis (PCA) in a multivariate statistical method.

For example, the product sample set includes M product samples, each of which has n dimensions of features, $\{V^1, V^2, \ldots, V^n\}$, $V^i=(v_1^i, v_2^i, \ldots, v_M^i)$, an average value is obtained for each of the raw parameters of all product samples GLASS, for example, $$\overline{x_1} = \frac{1}{M}\sum_{i=1}^{M} x_1^i.$$

Then, a new value $\{X^1, X^2, \ldots, X^n\}$ of the decentralized raw parameters is obtained by subtracting the average values from the raw parameters corresponding to each sheet of GLASS, $X^i=(x_1^i, x_2^i, \ldots, x_M^i)$ $$X = (X^1, X^2, \ldots, X^n) = \begin{bmatrix} x_1^1 & x_1^2 & \ldots & x_1^n \\ x_2^1 & x_2^2 & \ldots & x_2^n \\ \vdots & \vdots & \ddots & \vdots \\ x_M^1 & x_M^2 & \ldots & x_M^n \end{bmatrix}$$

Next, the electronic device may obtain a covariance matrix by obtaining a covariance of every two of the raw parameters in the second parameters, where each covariance value in the covariance matrix represents a similarity of two raw parameters.

For each of n dimensions of features in the above step, a covariance matrix is obtained.

For example, when n=2, the covariance matrix of $x_1$ and $x_2$ is shown below:

$$C = \begin{bmatrix} \text{cov}(x_1, x_1) & \text{cov}(x_1, x_2) \\ \text{cov}(x_2, x_1) & \text{cov}(x_2, x_2) \end{bmatrix}.$$

Based on the above idea, the covariance of every two of the raw parameters of the product sample may be obtained in the following formula:

$$\text{cov}(x_1, x_2) = \frac{\sum_{i=1}^{M}(x_1^i - \overline{x_1})(x_2^i - \overline{x_2})}{M-1}.$$

The covariance matrix corresponding to each product sample is as shown in Table 2.

TABLE 2

| Correlation coefficient matrix | | | | |
|---|---|---|---|---|
| | $x_1$ | $x_2$ | ... | $x_n$ |
| $x_1$ | 1.00 | 0.86 | ... | 0.37 |
| $x_2$ | 0.86 | 1.00 | ... | 0.69 |
| ... | ... | ... | ... | ... |
| $x_n$ | 0.37 | 0.69 | ... | 1.00 |

It should be noted that in the covariance matrix, on the diagonal are respective variances of the raw parameters and on the non-diagonal are covariances, and the covariance is used to measure a change degree that two raw parameters change at the same time. The larger the absolute value of the covariance is, the larger the influence of the two parameters on each other is, and vice versa.

Next, the electronic device may obtain feature values and feature vectors of the covariance matrix and obtain a cumulative contribution value corresponding to each of the feature values.

For example, the feature values and the feature vectors of the covariance matrix are obtained as shown in the following formula: Cu=λu. At this time, there will be n feature values λ, that is, each $\lambda_i$ corresponds to one feature vector $u_i$, namely, i=1,2, . . . ,n, $\lambda_1 > \lambda_2 > \ldots \lambda_n$. Further, at this time, $$u_i = \begin{bmatrix} \delta_1^1 \\ \vdots \\ \delta_n^1 \end{bmatrix}, u_2 = \begin{bmatrix} \delta_1^2 \\ \vdots \\ \delta_n^2 \end{bmatrix}, \ldots, u_n = \begin{bmatrix} \delta_1^n \\ \vdots \\ \delta_n^n \end{bmatrix},$$

that is, the feature vector corresponding to the i-th component is as shown in FIG. 3.

TABLE 3

Relationship of feature value and feature vector

| Feature vector | $u_1$ | $u_2$ | ... | $u_n$ |
|---|---|---|---|---|
| $x_1$ | $\delta_1^1$ | $\delta_1^2$ | ... | $\delta_1^n$ |
| $x_2$ | $\delta_2^1$ | $\delta_2^2$ | ... | $\delta_2^n$ |
| . | . | . | . | . |
| . | . | . | . | . |
| . | . | . | . | . |
| $x_n$ | $\delta_n^1$ | $\delta_n^2$ | ... | $\delta_n^n$ |
| Feature value | $\lambda_1$ | $\lambda_2$ | ... | $\lambda_n$ |
| Cumulative contribution rate | $\dfrac{\sum_{p=1}^{1}\lambda_p}{\sum_{p=1}^{n}\lambda_p}$ | $\dfrac{\sum_{p=1}^{2}\lambda_p}{\sum_{p=1}^{n}\lambda_p}$ | ... | $\dfrac{\sum_{p=1}^{n}\lambda_p}{\sum_{p=1}^{n}\lambda_p}$ |

Next, the electronic device may obtain K principal component features by obtaining feature values and feature vectors having cumulative contribution values exceeding a preset contribution value threshold. With a contribution value threshold 80% as an example, the electronic device may select the top K feature values and feature vectors having the cumulative contribution rate reaching 80%, {($\lambda_1$, $u_1$), ($\lambda_2$, $u_2$), . . . , ($\lambda_k$, $u_k$)}, thus obtaining K principal component features.

Finally, the electronic device may obtain a projection of each newly updated raw parameter of each product sample on the feature vector, and obtain the combination features in K dimensions of the product sample set or obtain the combination features in K dimensions of each product sample, where the combination features in K dimensions may be taken as the corresponding combination features in specified dimensions in this example.

For example, for decentralized new cause variable, the k principal component features after projection are:

$$\begin{bmatrix} F_1 \\ \vdots \\ F_k \end{bmatrix} = \begin{bmatrix} u_1^T \cdot (X^1, X^2, \ldots, X^n) \\ \vdots \\ u_K^T \cdot (X^1, X^2, \ldots, X^n) \end{bmatrix}.$$

Further, for each principal component feature in K dimensions, the following formula is satisfied:

$$F_j = u_j^T \cdot (X^1, X^2, \ldots, X^n) =$$

$$\delta_1^j X^1 + \delta_2^j X^2 + \ldots + \delta_n^j X^n = \begin{bmatrix} \delta_1^j x_1^1 + \delta_2^j x_1^2 + \ldots + \delta_n^j x_1^n \\ \delta_1^j x_2^1 + \delta_2^j x_2^2 + \ldots + \delta_n^j x_2^n \\ \vdots \\ \delta_1^j x_M^1 + \delta_2^j x_M^2 + \ldots + \delta_n^j x_M^n \end{bmatrix}.$$

In the formula, $u_j=(\delta_1^j, \delta_2^j, \ldots, \delta_n^j)^T$, j=1,2, . . . , k, namely, $\delta_1^j, \delta_2^j, \ldots, \delta_n^j$ are weights of n raw parameters in the j-th combination feature respectively, i.e. meaning that the j-th combination feature represents most information of these raw features, and these raw features have high similarity to each other. In an example, at least two raw parameters with weights ranked top may be selected and combined together. If the combination feature is determined as the at least one combination feature described in step 54, the at least two raw parameters with weights ranked top are displayed in a subsequent display process, thus helping a user to quickly locate a defect cause.

In addition, it should be noted that there maty be a case that a relevance relationship merely exists between data of the combination features in K dimensions obtained by PCA, but no corresponding relationship exists between the processes. In order to avoid such case, in another example, the electronic device may obtain first combination features. Illustratively, the electronic device may obtain a keyword corresponding to each of the raw parameters in the second parameter, where the keyword is a description for the value of the raw parameter, such as pressure, temperature and flow rate and the like, and in specific implementation, one keyword may be understood as one name of the raw parameter. Then, the electronic device may merge the keywords based on a preset process, where the process may include installation location of a production device, a sequence of production flows and process steps included in the production flows and the like, which is not limited herein. During the merging, raw parameters which may cause the same defect type may be merged into a same combination. For example, if raw parameters having the same keyword are merged, the electronic device may merge raw parameters in a same or different processes in a same sample production device, for example, merge temperature parameters in different processes into a combination representing a temperature. It may be understood that the merging only divides N raw parameters into different groups, but does not change the dimensions of the second parameter, namely, maintains the data of the raw parameters of N dimensions. Table 4 shows a data table formed after keyword-based merging.

TABLE 4

Data table obtained after keyword-based combination

| | Similarity combination | | | | | |
|---|---|---|---|---|---|---|
| | $S_1$ | | | | $S_t$ | |
| | | | | | Step (n-1)-Process | Step n-Process |
| GlassID | Step1-Process1-Paramter1_value | Step2-Process2-Parameter2_value | Step3-Process3-Parameter3_value | ... | (n-1)-Parameter (n-1)_value | n-Parameter n_value |
| GlassID 1 | 19.7 | 46.3 | 32.7 | ... | 442 | 457 |
| GlassID 2 | 19.3 | 46.7 | 33.1 | ... | 438 | 470 |
| ... | ... | ... | ... | ... | ... | ... |
| GlassID m | 19.5 | 46.5 | 32.9 | ... | 447 | 461 |

As shown in Table 4, the combination S1 includes three raw parameters, i.e. Step1-Process1-Paramter1_value, Step2-Process2-Paramter2_value and Step3-Process3-Paramter3_value; and the combination St includes two raw parameters, i.e. Step (n−1)-Process (n−1)-Paramter (n−1)_value and Step n-Process n-Paramter n_value.

In this example, after obtaining the first combination features and the combination features in K dimension, the electronic device may obtain combination features in R dimensions of the product sample set by obtaining an intersection of the first combination features and the combination features in K dimensions, that is, obtain the combination features in R dimensions of each of product samples in the product sample set and then take the combination features in R dimensions as the combination features in specified dimensions. For example, the electronic device may perform combination comparison for the t combination features matched with the keyword and the combination features in K dimensions one by one to ensure different combinations are not only similar to each other in name (i.e. each process device and process parameter class) but also related with each other in numerical analysis. The final combination features in R dimensions may be obtained finally by removing those principal components which do not satisfy both of the two conditions. Considering the combination feature in each dimension in the combination features in R dimensions may include at least one raw parameter, for subsequent computing process, two raw parameters are selected for the combination feature in each dimension in the example, with an effect shown in Table 5.

It should be noted that, in an actual application, two raw parameters with larger weights may also be selected to represent the combination feature in each dimension in the combination features in K dimensions. If the two raw parameters are in any one combination feature in the t combination features, this combination feature in the combination features in K dimensions are retained. After comparison one by one, some combination features of the combination features in K dimensions may be removed to obtain the combination features in R dimensions. A skilled person may select a proper solution based on specific scenario and the corresponding solution falls into the scope of protection of the present disclosure.

At step 53, influence scores respectively for the combination features in specified dimensions are obtained based on the first parameters and the combination features in specified dimensions, where the influence scores are used to respectively represent degrees that the combination features affect the product defect.

In this embodiment, the electronic device may obtain a combination feature vector of each dimension based on the combination features in specified dimensions (K dimensions or R dimensions), where the combination feature vector of each dimension includes the combination features in same dimension for the respective product samples. In other words, the combination features in R dimensions of the product sample are formed with raw parameters as elements, and the combination features in the dimensions of each product sample are extracted and re-formed into one feature vector, so as to obtain the combination feature vectors of the

TABLE 5

Correspondence of the combination features in R dimensions and the focusing threshold after combination

| | Similarity Combination | | | | | | |
|---|---|---|---|---|---|---|---|
| | Step1-Process1-Parameter1_value | Step1-Process1-Parameter1_value | Step5-Process5-Parameter5_value | Step4-Process4-Parameter4_value | Step a-Process a-Parametera_value | Step b-Process b-Parameterb_value | Defect_code1 |
| GlassID | $F_1$ | | $F_2$ | | ... | $F_r$ | ratio |
| GlassID 1 | $F_1^1$ | | $F_1^2$ | | ... | $F_1^r$ | 0.022 |
| GlassID 2 | $F_2^1$ | | $F_2^2$ | | ... | $F_2^r$ | 0.264 |
| ... | ... | | ... | | ... | ... | ... |
| GlassID m | $F_m^1$ | | $F_m^2$ | | ... | $F_m^r$ | 0.011 |

In Table 5, Fr represents the r-th combination feature in the combination features in R dimensions, where the combination feature includes raw parameters Step a-Process a-Paramter a_value and Step b-Process b-Paramter b_value.

dimensions. For example, in a given product sample set X, any one combination feature vector is $F_1=(F_1^j, F_2^j, \ldots, F_m^j)$.

Then, the electronic device may calculate a purity index corresponding to the combination feature in each dimension, to obtain purity indexes with the same number as the product samples in the product sample set, where the purity index is used to represent a degree that each of the combination features affects the product defect.

In some embodiments, the yield rate purity index includes at least one of information gain, information gain ratio and Gini coefficient.

In an embodiment, the purity index may be represented by information entropy, where the smaller the information entropy is, the higher the purity is. A lower purity represents a higher uncertainty of the feature, namely, the sample production device has less influence on occurrence of the type of defect to the samples; a higher purity represents a lower uncertainty of the feature, namely, the sample production device has more influence on occurrence of the type of defect to the product samples. In some embodiments of the present disclosure, the purity index may also be represented by Gini coefficient, where the smaller the Gini coefficient is, the higher the purity of the sample set is.

A yield rate purity index of the sample production device for multiple product samples represents a purity of the sample production device for occurrence of the type of defect to multiple product samples. For example, the lower the yield rate purity index of the sample production device is, the higher the uncertainty of the sample production device for occurrence of the type of defect to the samples; the smaller the influence of the sample production device on occurrence of the type of defect to the samples is, the higher the yield rate purity index is; the lower the uncertainty of the sample production device for occurrence of the type of defect to the samples is, the larger the influence of the sample production device on occurrence of the type of defect to the samples.

In an embodiment, for the process devices or sample production devices which the samples have undergone in a production process, it is required to locate an attribute causing the samples to have the type of defect in a manufacturing process of each working procedure of the samples and a huge volume of data of the sample production devices, namely, to sort attributes of branching nodes of a decision tree based on feature importance. Therefore, in the present disclosure, based on the idea of constructing a decision tree, multiple sample production devices are taken as features and sorted based on purity indexes.

It should be noted that in the embodiments of the present disclosure, the decision tree is not constructed by directly using the decision tree, and the technical problem to be solved is not a prediction problem to be solved by the decision tree, but combine the idea of purity improvement in the decision tree and the yield rate analysis problem to solve the problem of quick locating an influence cause of a defective degree based on big data technology. Alternatively, in the embodiment, a particular combination feature is taken as a sub-node of the decision tree, i.e. feature attribute of binary classification, to determine whether it is an optimal cut point; the influence degree and importance of each feature for the entire sample set are calculated based on Gini coefficient in an impurity measure method in a CART tree, where the smaller the Gini coefficient is, the lower the uncertainty is, and the better it is taken as cut point. In the embodiments of the present disclosure, in a classification problem of whether it is defective or not, the number of types is K=2, and the purity index is calculated in the following formula when the purity index is the Gini coefficient:

$$Gini(X) = 1 - \sum_{K=1}^{2}\left(\frac{|C_K|}{|X|}\right)^2;$$

wherein |X| represents, when any one combination feature vector in the product sample set X is taken as a cut point, a number of product samples in a data combination located at a specified side of the cut point; K represents a type of the product defects, which is preset as 2 types, herein; $|C_K|$ represents a number of product samples of the K-th type in the data combination located at the specified side of the cut point. For example, the product sample is a display panel. In this example, when the product sample is smaller than the cut point, the defect type of the product sample is not affected at this time; when the product sample is equal to or greater than the cut point (corresponding to the specified side of the cut point as above), the defect type of the product sample will be affected at this time. Further, when K=1, it represents a number of good product samples affecting the defect type; when k=2, it represents a number of defective product samples affecting the defect type. In some scenarios, when the product sample is smaller than the cut point, the corresponding specified side of the cut point as above may be selected by a skilled person according to specific scenario, which is not limited herein.

The M combination feature vectors in Fj is divided into two groups based on their values, with any value in Fj (e.g. F11) as a cut point, and then there are a number subbad of Glasses are divided as defect samples and a number subgood of Glasses are divided as defect-less samples. At this time, a contingency table as shown in Table 6 may be obtained. According to the contingency table, M Ginis may be obtained.

TABLE 6

| Contingency table | | |
| --- | --- | --- |
| | Defect | Good |
| ≥cutpoint goup | subbad | subgood |
| <cutpoint group | B-subbad | G-subgood |

Afterwards, the electronic device may obtain a minimum value of the purity indexes corresponding to the combination features in each dimension, where the minimum value is used to represent a confidence threshold of the first parameter. The smallest one selected from the M Ginis corresponds to the optimal cut point. Alternatively, the minimum value is used to represent the confidence threshold of the first parameter.

Finally, the electronic device may obtain the influence score for the corresponding combination features based on the minimum value, that is, the electronic device may obtain the influence score for the j-th combination features based on (1 minus–the minimum Gini coefficient).

At step 54, at least one combination feature ranked top is obtained by sorting the combination features based on the influence scores, and a raw parameter corresponding to the at least one combination feature is taken as a cause of the product defect.

In this embodiment, the electronic device may sort the corresponding combination features in R dimensions based on the influence scores, for example, in a descending or ascending order, to obtain a degree that the raw parameter of the each of the combination features affects the first parameter of the product sample. FIG. 9 shows an effect of two raw parameters with weights ranked top. As shown in FIG. 9, in the third interface, for the current defect type, the cause of the defect type may include: step3-process3-param3 and step4-process4-param4 of the product sample 1. In this case, the user may clearly locate a combination feature ranked top (i.e. raw parameter) and the like, thereby performing specific defect check and processing and improving the detection efficiency.

Therefore, in the technical solution provided by the embodiments of the present disclosure, the combination features in specified dimensions of each product sample may be obtained to reduce a dimension of data of the product sample, where the dimension of the combination features in specified dimensions is smaller than that of parameter in each product sample; further, the combination features in specified dimensions may be a combination of raw parameters having similarity, such that similar parameters are associated while raw information of the product sample is retained, thereby facilitating fast locating a cause of the product defect and improving the detection efficiency.

Figure 10:
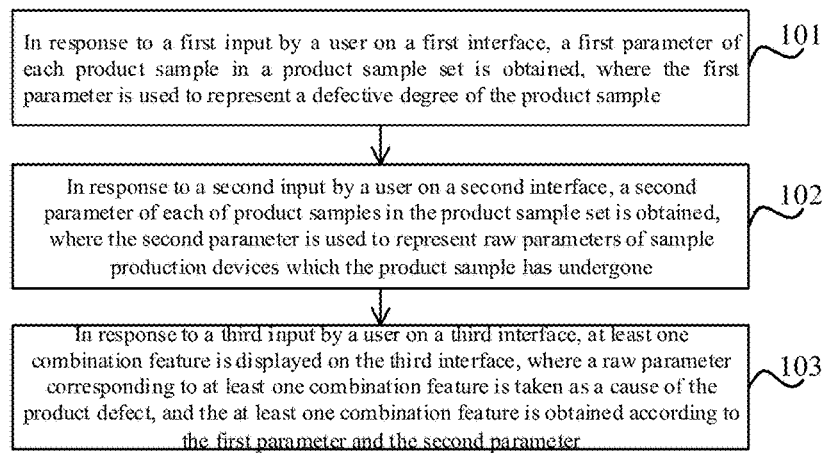
FIG. 10 is a flowchart illustrating another data processing method according to an embodiment of the present disclosure.

One or more embodiments of the present disclosure further provide a data processing method. As shown in FIG. 10, the method includes the following steps.

At step 101, in response to a first input by a user on a first interface, a first parameter of each product sample in a product sample set is obtained, where the first parameter is used to represent a defective degree of the product sample.

At step 102, in response to a second input by a user on a second interface, a second parameter of each of product samples in the product sample set is obtained, where the second parameter is used to represent raw parameters of sample production devices which the product sample has undergone.

At step 103, in response to a third input by a user on a third interface, at least one combination feature is displayed on the third interface, where a raw parameter corresponding to at least one combination feature is taken as a cause of the product defect, and the at least one combination feature is obtained according to the first parameter and the second parameter.

In an embodiment, the at least one combination feature displayed on the third interface is sorted in a descending or ascending order according to the corresponding influence scores; the influence scores are used to respectively represent degrees that the combination features affect the product defect.

In an embodiment, displaying at least one combination feature on the third interface includes:
for each of the at least one combination feature, displaying at least two raw parameters with weights ranked top in the combination features.

In an embodiment, obtaining at least one combination feature according to the first parameter and the second parameter specifically includes:
obtaining combination features in specified dimensions of the product sample set by processing the second parameters of the product samples in the product sample set based on a preset dimension reduction algorithm, where each of the combination features in the combination feature in specified dimensions refers to a combination of raw parameters relating to the product defect;
obtaining influence scores respectively for the combination features in specified dimensions based on the first parameters and the combination features in specified dimensions, where the influence scores are used to respectively represent degrees that the combination features affect the product defect;
obtaining at least one combination feature ranked top by sorting the combination features based on the influence scores, and taking a raw parameter corresponding to the at least one combination feature as a cause of the product defect.

In an embodiment, after obtaining the first parameter of each of product samples in the product sample set, the method further includes:
displaying a distribution diagram of the first parameter of each product sample.

In an embodiment, after obtaining the second parameter of each of product samples in the product sample set, the method further includes:
displaying a corresponding relationship of each second parameter.

In an embodiment, the product sample includes a display panel motherboard; the display panel motherboard includes a plurality of display panels.

Further, obtaining at least one combination feature according to the first parameter and the second parameter specifically includes:
obtaining combination features in specified dimensions of the product sample set by processing the second parameters of the product samples in the product sample set based on a preset dimension reduction algorithm, where each of the combination features in specified dimensions refers to a combination of raw parameters relating to the product defect;
obtaining influence scores respectively for the combination features in specified dimensions based on the first parameters and the combination features in specified dimensions, where the influence scores are used to respectively represent degrees that the combination features affect the product defect;
obtaining at least one combination feature ranked top by sorting the combination features based on the influence scores, and taking a raw parameter corresponding to the at least one combination feature as a cause of the product defect.

In an embodiment, after obtaining the first parameter of each of product samples in the product sample set, the method further includes:
displaying a distribution diagram of the first parameter of each product sample.

In an embodiment, after obtaining the second parameter of each of product samples in the product sample set, the method further includes:
displaying a corresponding relationship of each second parameter.

In an embodiment, the product sample includes a display panel motherboard; the display panel motherboard includes a plurality of display panels.

Figure 11:
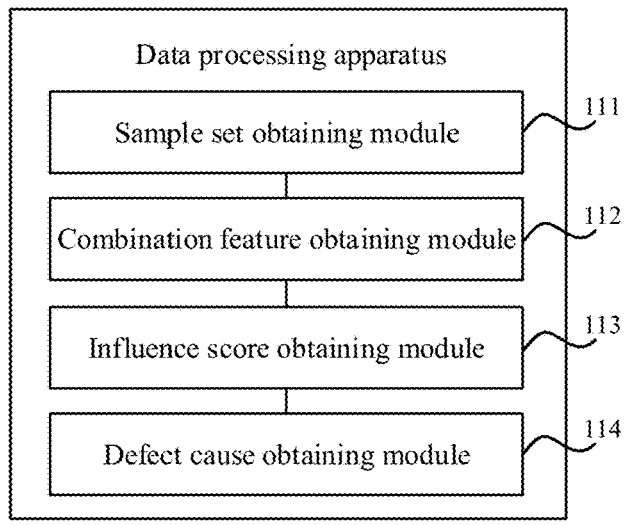
FIG. 11 is a block diagram illustrating a data processing apparatus according to an embodiment of the present disclosure.

One or more embodiments of the present disclosure provide a data processing apparatus. As shown in FIG. 11, the apparatus includes:
a sample set obtaining module 111, configured to obtain a product sample set, where each of product samples in the product sample set includes a first parameter and a second parameter, the first parameter is used to represent a defective degree of the product sample, and the second parameter is used to represent raw parameters of sample production devices which the product sample has undergone;
a combination feature obtaining module 112, configured to obtain combination features in specified dimensions of the product sample set by processing the second parameters of the product samples in the product sample set based on a preset dimension reduction algorithm, where each of the combination features in specified dimensions refers to a combination of raw parameters relating to the product defect;

an influence score obtaining module 113, configured to obtain influence scores respectively for the combination features in specified dimensions based on the first parameters and the combination features in specified dimensions, where the influence scores are used to respectively represent degrees that the combination features affect the product defect;

a defect cause obtaining module 114, configured to obtain at least one combination feature ranked top by sorting the combination features based on the influence scores, and take a raw parameter corresponding to the at least one combination feature as a cause of the product defect.

In an embodiment, the combination feature obtaining module includes:

an average value obtaining unit, configured to obtain an average value of each of the raw parameters in the product sample set, and obtain a new value of each of the raw parameters in the product sample set by subtracting the corresponding average value from each of the raw parameters in the product sample set;

a covariance obtaining unit, configured to obtain a covariance matrix by obtaining a covariance of every two of the raw parameters in the second parameter, where each covariance value in the covariance matrix represents a similarity of two raw parameters;

a contribution value obtaining unit, configured to obtain feature values and feature vectors of the covariance matrix, and obtain a cumulative contribution value corresponding to each of the feature values, where the feature vector includes a weight corresponding to each of the raw parameters;

a feature value obtaining unit, configured to obtain K principal component features by obtaining the feature values and the feature vectors with the cumulative contribution values exceeding a preset contribution value threshold;

a combination feature obtaining unit, configured to obtain combination features in K dimensions of the product sample set by obtaining a projection of the new value of each of the raw parameters of each product sample on the feature vector; and take the combination features in K dimensions as the combination features in specified dimensions.

In an embodiment, the combination feature obtaining module further includes:

a first feature obtaining unit, configured to obtain a first combination feature for each product sample by merging the raw parameters based on a keyword in the second parameter;

the combination feature obtaining unit is further configured to obtain combination features in R dimensions of the product sample set by obtaining an intersection of the first combination features and the combination features in K dimensions, and take the combination features in R dimensions as the combination features in specified dimensions.

In an embodiment, the influence score obtaining module includes:

a feature vector obtaining sub-unit, configured to obtain a combination feature vector in each of the specified dimensions based on the combination features in specified dimensions; where the combination feature vector in each of the specified dimensions includes the combination features in same dimension for the respective product samples;

an index value calculating sub-unit, configured to obtain purity indexes with the same number as the product samples in the product sample set by calculating the purity indexes respectively corresponding to the combination features in each of the specified dimensions, where the purity index is used to represent a degree that each of the combination features affects the product defect;

a minimum value obtaining sub-unit, configured to obtain a minimum value of the purity indexes corresponding to the combination features in each of the specified dimensions, where the minimum value is used to represent a confidence threshold of the first parameter;

an influence score obtaining sub-unit, configured to obtain the influence score for the corresponding combination feature based on the minimum value.

In an embodiment, the purity index includes at least one of information gain, information gain ratio and Gini coefficient.

In an embodiment, the Gini coefficient is calculated in the following formula:

$$Gini(X) = 1 - \sum_{K=1}^{2} \left( \frac{|C_K|}{|X|} \right)^2$$

wherein |X| represents, when any one combination feature vector in the product sample set X is taken as a cut point, a number of product samples in a data combination located at a specified side of the cut point; K represents a number of types of a product defect, which is valued as 2 herein; $|C_K|$ represents a number of product samples of the K-th class in the data combination located at the specified side of the cut point. It is understood that since the apparatus provided by the embodiments of the present disclosure corresponds to the above method, reference may be made to the contents of the embodiments of the method for specific contents and no redundant descriptions are made herein.

Figure 12:
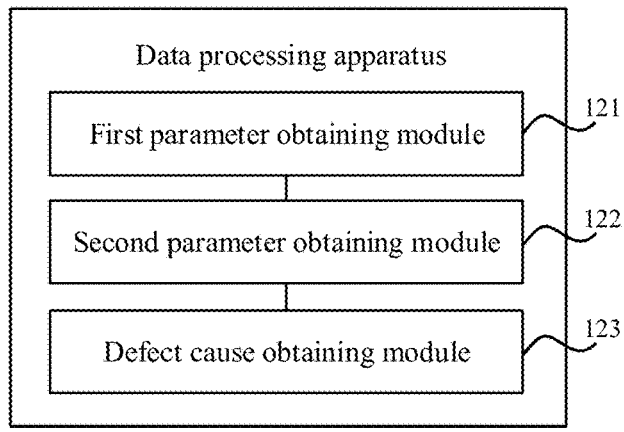
FIG. 12 is a block diagram illustrating another data processing apparatus according to an embodiment of the present disclosure.

One or more embodiments of the present disclosure further provide a data processing apparatus. As shown in FIG. 12, the apparatus includes:

a first parameter obtaining module 121, configured to, in response to a first input by a user on a first interface, obtain a first parameter of each product sample in a product sample set, where the first parameter is used to represent a defective degree of the product sample;

a second parameter obtaining module 122, configured to, in response to a second input by a user on a second interface, obtain a second parameter of each of product samples in the product sample set, where the second parameter is used to represent raw parameters of sample production devices which the product sample has undergone;

a defect cause obtaining module 123, configured to, in response to a third input by a user on a third interface, display at least one combination feature on the third interface, where a raw parameter corresponding to at least one combination feature is taken as a cause of the product defect, and the at least one combination feature is obtained according to the first parameter and the second parameter.

In an embodiment, the at least one combination feature displayed on the third interface is sorted in a descending or ascending order according to the corresponding influence scores; the influence scores are used to respectively represent degrees that the combination features affect the product defect. In an embodiment, the defect cause obtaining module includes:

a raw parameter displaying unit, configured to, for each of the at least one combination feature, display at least two raw parameters with weights ranked top in the combination features.

In an embodiment, the defect cause obtaining module is further configured to obtain the at least one combination feature according to the first parameter and the second parameter, specifically including:

a combination feature obtaining unit, configured to obtain combination features in specified dimensions of the product sample set by processing the second parameters of the product, samples in the product sample set based on a preset dimension reduction algorithm, where each of the combination features in specified dimensions refers to a combination of raw parameters relating to the product defect;

an influence score obtaining unit, configured to obtain influence scores respectively for the combination features in specified dimensions based on the first parameters and the combination features in specified dimensions, where the influence scores are used to respectively represent degrees that the combination features affect the product defect;

a defect cause obtaining unit, configured to obtain at least one combination feature ranked top by sorting the combination features based on the influence scores, and take a raw parameter corresponding to the at least one combination feature as a cause of the product defect.

In an embodiment, the apparatus further includes:

a distribution diagram displaying module, configured to display a distribution diagram of the first parameter of each product sample.

In an embodiment, the apparatus further includes:

a corresponding relationship displaying module, configured to display a corresponding relationship of each second parameter.

In an embodiment, the product sample includes a display panel motherboard; the display panel motherboard includes a plurality of display panels.

It is understood that since the apparatus provided by the embodiments of the present disclosure corresponds to the above method, reference may be made to the contents of the embodiments of the method for specific contents and no redundant descriptions are made herein.

In an exemplary embodiment, there is further provided an electronic device, including:

a display;
a processor;
a memory configured to store computer programs executable by the processor;
where the processor is configured to execute the computer programs in the memory to implement the steps of the method shown in FIG. 1.

In an exemplary embodiment, there is further provided a computer readable storage medium including executable computer programs, for example, a memory including instructions, where the above executable computer programs may be executed by a processor to implement the steps of the above method. The readable storage medium may be Read Only Memory (ROM), Random Access Memory (RAM), CD-ROM, magnetic tape, floppy disk and optical data storage device and the like.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the related art that are not disclosed in the present disclosure. The specification and examples are considered as exemplary only, with a true scope and spirit of the present disclosure being indicated by the following claims.

It is to be understood that the present disclosure is not limited to the precise structure described above and shown in the accompanying drawings, and that various modifications and changes may be made without departing from the scope thereof. The scope of the present disclosure is limited only by the appended claims.

The invention claimed is:

1. A data processing method, applied to a data processing system, and the method comprising:

obtaining, by a distributed storage apparatus of the data processing system through a data extraction tool, production data generated by multiple sample production devices from a production manufacturing system;

storing the production data in the distributed storage apparatus in a format of Hive tool or Hbase database;

in response to a first input by a user on a first interface of a display of the data processing system, obtaining a first parameter of each product sample in a product sample set from the production data stored in the distributed storage apparatus, wherein the first parameter is used to represent a defective degree of the product sample;

in response to a second input by a user on a second interface of the display, obtaining a second parameter of each of product samples in the product sample set from the production data stored in the distributed storage apparatus, wherein the second parameter is used to represent raw parameters of sample production devices which the product sample has undergone; and wherein the second parameter comprises: a name, a model or a code of the sample production device which the product sample has undergone, names of process station, production line or factory where the sample production device is located, and a time when the sample production device completes the production of the sample;

in response to a third input by a user on a third interface of the display, displaying at least one combination feature on the third interface of the display, wherein a raw parameter corresponding to at least one combination feature is taken as a cause of a product defect, and the at least one combination feature is obtained according to the first parameter and the second parameter;

wherein obtaining the at least one combination feature according to the first parameter and the second parameter comprises:

obtaining combination features in specified dimensions of the product sample set by processing the second parameters of the product samples in the product sample set based on a preset dimension reduction algorithm, wherein each of the combination features in specified dimensions refers to a combination of the raw parameters relating to the product defect;

obtaining influence scores respectively for the combination features in specified dimensions based on the first parameters and the combination features in specified dimensions, wherein the influence scores are used to respectively represent degrees that the combination features affect the product defect;

obtaining at least one combination feature ranked top by sorting the combination features based on the influence scores, and taking a raw parameter corresponding to the at least one combination feature as a cause of the product defect;

wherein the dimension reduction algorithm comprises principal component analysis (PCA), and obtaining the combination features in specified dimensions of the product sample set by processing the second parameter based on the preset dimension reduction algorithm comprises:

obtaining a first combination feature for each product sample by merging the raw parameters based on a keyword in the second parameter;

obtaining the combination features in K dimensions of the product sample set by processing the second parameters based on PCA;

obtaining combination features in R dimensions of the product sample set by obtaining an intersection of the first combination features and the combination features in K dimensions, and taking the combination features in R dimensions as the combination features in specified dimensions.

2. The method of claim 1, wherein the at least one combination feature displayed on the third interface is sorted in a descending or ascending order according to the corresponding influence scores; the influence scores are used to respectively represent degrees that the combination features affect the product defect.

3. The method of claim 1, wherein displaying at least one combination feature on the third interface comprises:

for each of the at least one combination feature, displaying at least two raw parameters with weights ranked top in the combination features.

4. The method of claim 1, wherein after obtaining the first parameter of each of product samples in the product sample set, the method further comprises:

displaying a distribution diagram of the first parameter of each product sample.

5. The method of claim 1, wherein after obtaining the second parameter of each of product samples in the product sample set, the method further comprises:

displaying a corresponding relationship of each second parameter.

6. The method of claim 1, wherein the product sample comprises a display panel motherboard; the display panel motherboard comprises a plurality of display panels.

7. The method of claim 1, wherein obtaining the combination features in K dimensions of the product sample set by processing the second parameters based on PCA comprises:

obtaining an average value for each of the raw parameters of the product sample set and obtaining a new value of each of the raw parameters in the product sample set by subtracting the corresponding average value from each of the raw parameters in the product sample set;

obtaining a covariance matrix by obtaining a covariance of every two of the raw parameters in the second parameter, wherein each covariance value in the covariance matrix represents a similarity of two raw parameters;

obtaining feature values and feature vectors of the covariance matrix, and obtaining a cumulative contribution value corresponding to each of the feature values, wherein the feature vector comprises a weight corresponding to each of the raw parameters;

obtaining K principal component features by obtaining the feature values and the feature vectors with the cumulative contribution values exceeding a preset contribution value threshold;

obtaining the combination features in K dimensions of the product sample set by obtaining a component of the new value of each of the raw parameters on the feature vector.

8. The method of claim 1, wherein obtaining influence scores respectively for the combination features in specified dimensions based on the first parameters and the combination features in specified dimensions comprises:

obtaining a combination feature vector in each of the specified dimensions based on the combination features in specified dimensions, wherein the combination feature vector in each of the specified dimensions comprises the combination features in same dimension for the respective product samples;

obtaining purity indexes with the same number as the product samples in the product sample set by calculating the purity indexes respectively corresponding to the combination features in each of the specified dimensions, wherein the purity index is used to represent a degree that each of the combination features affects the product defect;

obtaining a minimum value of the purity indexes corresponding to the combination features in each of the specified dimensions, wherein the minimum value is used to represent a confidence threshold of the first parameter;

obtaining the influence score for the corresponding combination feature based on the minimum value.

9. The method of claim 8, wherein the purity index comprises at least one of information gain, information gain ratio and Gini coefficient.

10. The method of claim 9, wherein the Gini coefficient is calculated in the following formula:

$$Gini(X) = 1 - \sum_{K=1}^{2} \left(\frac{|C_K|}{|X|}\right)^2$$

wherein |X| represents, when any one combination feature vector in the product sample set X is taken as a cut point, a number of product samples in a data combination located at a specified side of the cut point; K represents a type of the product defect, which is set as 2 types herein; $|C_K|$ represents a number of product samples of the K-th class in the data combination located at the specified side of the cut point.

11. An electronic device, comprising:

a display;

a processor; and a memory configured to store computer programs executable by the processor;

wherein the processor is configured to execute the computer programs in the memory to implement the method according to claim 1.

12. A non-transitory computer readable storage medium, wherein executable computer programs in the non-transitory computer readable storage medium are executed by a processor to implement the method according to claim 1.

* * * * *